United States Patent [19]

Bobry

[11] 4,455,600

[45] Jun. 19, 1984

[54] SINGLE PHASE, DOUBLE-ENDED THYRISTOR INVERTER WITH CHOKE-COUPLED IMPULSE COMMUTATION

[75] Inventor: Howard H. Bobry, Westlake, Ohio

[73] Assignee: Lortec Power Systems, Inc., North Ridgeville, Ohio

[21] Appl. No.: 385,521

[22] Filed: Jun. 7, 1982

[51] Int. Cl.³ .......................................... H02M 7/515
[52] U.S. Cl. ...................................... 363/139; 363/75
[58] Field of Search ................... 363/75, 96, 121, 139; 307/66

[56] References Cited

U.S. PATENT DOCUMENTS 3,343,065 9/1967 Gurnett ................................ 363/96
3,418,559 12/1968 Rolfes .................................... 307/66

FOREIGN PATENT DOCUMENTS 641611 1/1979 U.S.S.R. .............................. 363/139

OTHER PUBLICATIONS

Int. J. Electronics, Dec. 1980, vol. 49, No. 6, pp. 503-512.

*Primary Examiner*—William H. Beha, Jr.
*Attorney, Agent, or Firm*—Pearne, Gordon, Sessions, McCoy, Granger & Tilberry

[57] ABSTRACT

A parallel inverter circuit for converting DC voltage to a variable AC voltage. One terminal of the DC source is connected to an inductor and, in turn, through a pair of gate-controlled, main rectifiers (SCR's), to the opposite ends of a transformer primary winding. A center tap of the primary winding is connected to the other terminal of the DC source. A commutating capacitance is connected across the transformer primary winding and a means is provided for alternately gating the rectifiers. The level of the voltage wave generated across the primary winding of the transformer is varied by means of two gate-controlled, auxiliary rectifiers (SCR's) connected in parallel across the primary winding in reverse directions, and by a pair of additional windings coupled to the inductor referred to above and including one such winding in series with one of the auxiliary rectifiers and another winding in series with the other auxiliary rectifier. The auxiliary rectifiers are gated so that one initially opens a circuit path bypassing the previously gated main rectifier as that rectifier is commutated. After commutation, the other auxiliary rectifier conducts current to continue shorting across the primary winding of the transformer to produce a zero voltage interval. A phase-adjustable gating means is provided for the auxiliary rectifiers.

2 Claims, 2 Drawing Figures

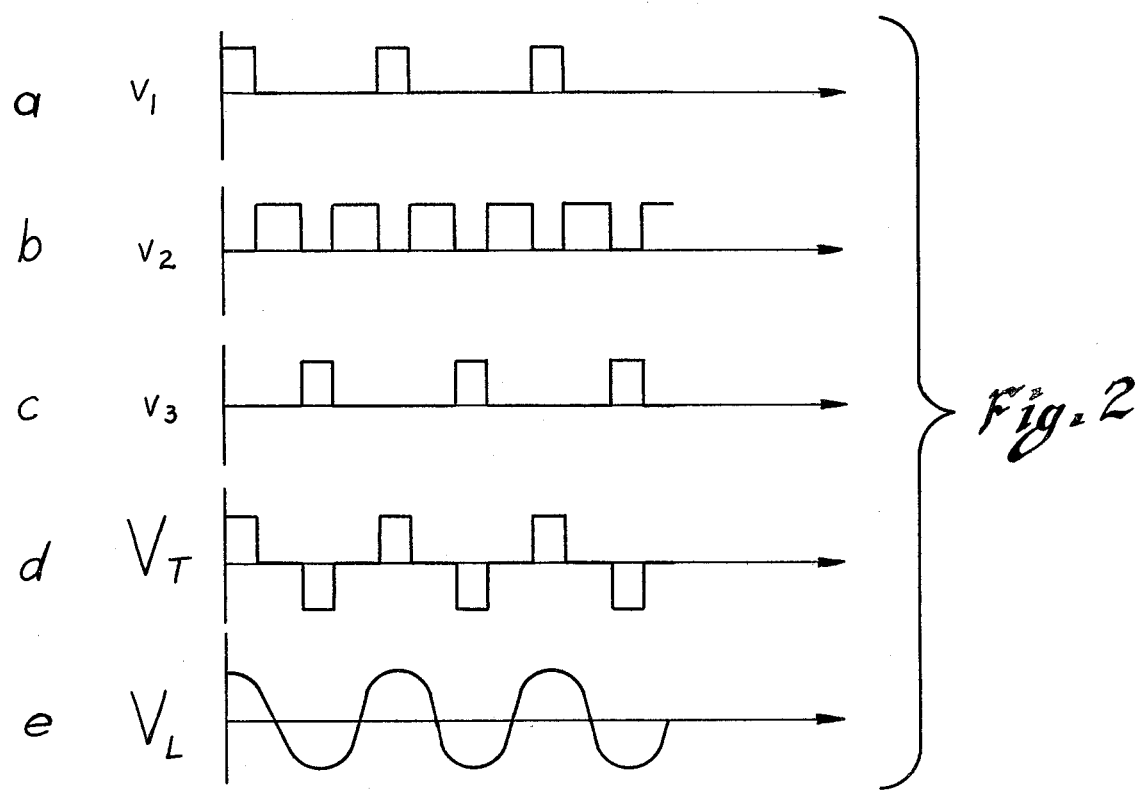

SINGLE PHASE, DOUBLE-ENDED THYRISTOR INVERTER WITH CHOKE-COUPLED IMPULSE COMMUTATION

BACKGROUND OF THE INVENTION

This invention relates to inverter circuits for converting DC voltage to AC voltage, and especially to inverters of the type that use a center-tapped load. More particularly, the invention relates to a means for varying the waveform generated by a center-tapped-load type inverter in order to permit control of the effective AC voltage level produced.

Standby power equipment, often including batteries, is frequently used in systems having loads that must be quickly energized during a failure of commercial power. Such systems are referred to as "uninterruptible power systems." Typical applications where such standby power sources are required are in communication systems (telecommunications—especially in switching stations), computer systems such as in the case of hospital records wherein patient information in a memory must not be lost, and process control systems.

In many of these applications, it is important that the standby power source be put on-line very quickly in the event of a primary power failure. If it were not, computer memory could be lost or communications could be interrupted, each with disastrous consequences.

Accordingly, standby batteries with DC to AC inverters are often used to quickly place a desired voltage on-line in the event of a commercial power failure. In some cases, an AC voltage from the secondary winding of an inverter transformer is used directly, and in other cases the resulting AC voltage is rectified to a DC voltage at the desired level.

The design of suitable circuits for inverters has resulted in two basic types, the so-called "bridge" type and the "center-tapped transformer" type. The bridge type, such as those shown in U.S. Pat. Nos. 3,422,342 and 4,196,468, has the advantage of having a variable AC voltage output. The variation of the voltage waveform is accomplished by adjusting the phase angle between the two branches of the bridge.

This type of inverter has two major disadvantages, however, in the more common applications. First, two sets (pairs) of commutating capacitors are needed and, second, all power must flow through two gate-controlled rectifiers (SCR's), a condition that seriously limits the efficiency of the inverter.

The second basic type of inverter is the center-tapped-load type, such as those disclosed in the following U.S. Pat. Nos.: 3,317,816; 3,407,349; 3,424,973; 3,702,432; 3,781,643; 4,161,773; 4,274,137.

This type of inverter circuit has greater efficiency than the so-called "bridge" type, especially at low voltage levels, but prior art designs do not permit variation of the voltage waveform produced. The voltage produced across the secondary windings of the transformer in this type of inverter circuit is a square wave, and thus the waveform has no zero voltage intervals that could be adjusted to permit variation.

In these circuits, one terminal of the DC source is connected to an inductor and, in turn, through a pair of parallel, gate-controlled rectifiers (SCR's), to the opposite ends of a transformer primary winding. A center tap of the primary winding is connected to the other terminal of the DC source and a commutating capacitor is connected across the transformer primary winding. A trigger voltage signal is generated for alternately gating the rectifiers to produce the square wave across the primary winding of the transformer.

As indicated above, this circuit does not permit varying of the voltage level of the square wave generated across the secondary winding of the transformer because either one or the other of the SCR's must be conducting current at all times. Accordingly, the output voltage has only two states—positive or negative. In order to produce a variable waveform, a third state is required—namely, a condition of zero voltage across the secondary winding of the transformer.

The circuit of the present invention achieves the desired capabilities described above, and affords other features and advantages heretofore not obtainable.

SUMMARY OF THE INVENTION

It is among the objects of the present invention to provide an inverter (of the center-tapped-load type) for use in an uninterruptible power supply system wherein the voltage waveform generated across the secondary winding of the transformer may be varied.

Another object is to provide an uninterruptible power supply system of the type described above capable of operating at a high efficiency level and being especially adapted for low DC input voltage applications (e.g., 52 volts) and wherein means is provided for varying the voltage level produced.

These and other objects and advantages are obtained with the novel parallel inverter circuit design of the invention, which is based on the basic center-tapped-load type circuit. The circuit includes the traditional center-tapped-load type inverter circuit elements wherein one terminal of the DC source is connected to an inductive coupling and, in turn, through a parallel pair of gate-controlled, main rectifiers (SCR's), to the opposite ends of a transformer primary winding. A center tap of the primary winding is connected to the other terminal of the DC source and a commutating capacitor is connected across the transformer primary winding. A triggering means is provided for alternately gating the main rectifiers.

The level of the voltage wave generated across the primary winding of the transformer is varied by means of two gate-controlled, auxiliary rectifiers (SCR's) connected in parallel across the primary winding in reverse directions and by two additional windings on the inductor referred to above and including one such winding in series with one of the auxiliary rectifiers and another winding in series with the other of the auxiliary rectifiers. The auxiliary rectifiers are gated so that one initially opens a circuit path, bypassing the previously gated main rectifier as that rectifier is commutated, and after commutation, the other auxiliary rectifier conducts current to continue the shorting of the primary winding of the transformer to produce zero voltage during a desired time interval. A phase-adjustable gating means is provided for the auxiliary rectifiers. By controlling the phasing of the adjustable gating means for the auxiliary rectifiers relative to the means for gating the main rectifiers, the shape of the waveform across the primary windings of the transformer can be varied, thus changing the effective voltage produced.

BRIEF DESCRIPTION OF THE DRAWINGS

Referring to the drawings:

FIG. 2 is a series of graphs illustrating the phasing of the gating voltages (a, b, c) used to trigger or gate the SCR's shown in FIG. 1 and the voltage waveform (d) across the transformer primary winding as well as the load voltage (e).

DESCRIPTION OF THE PREFERRED EMBODIMENT

Figure 1:
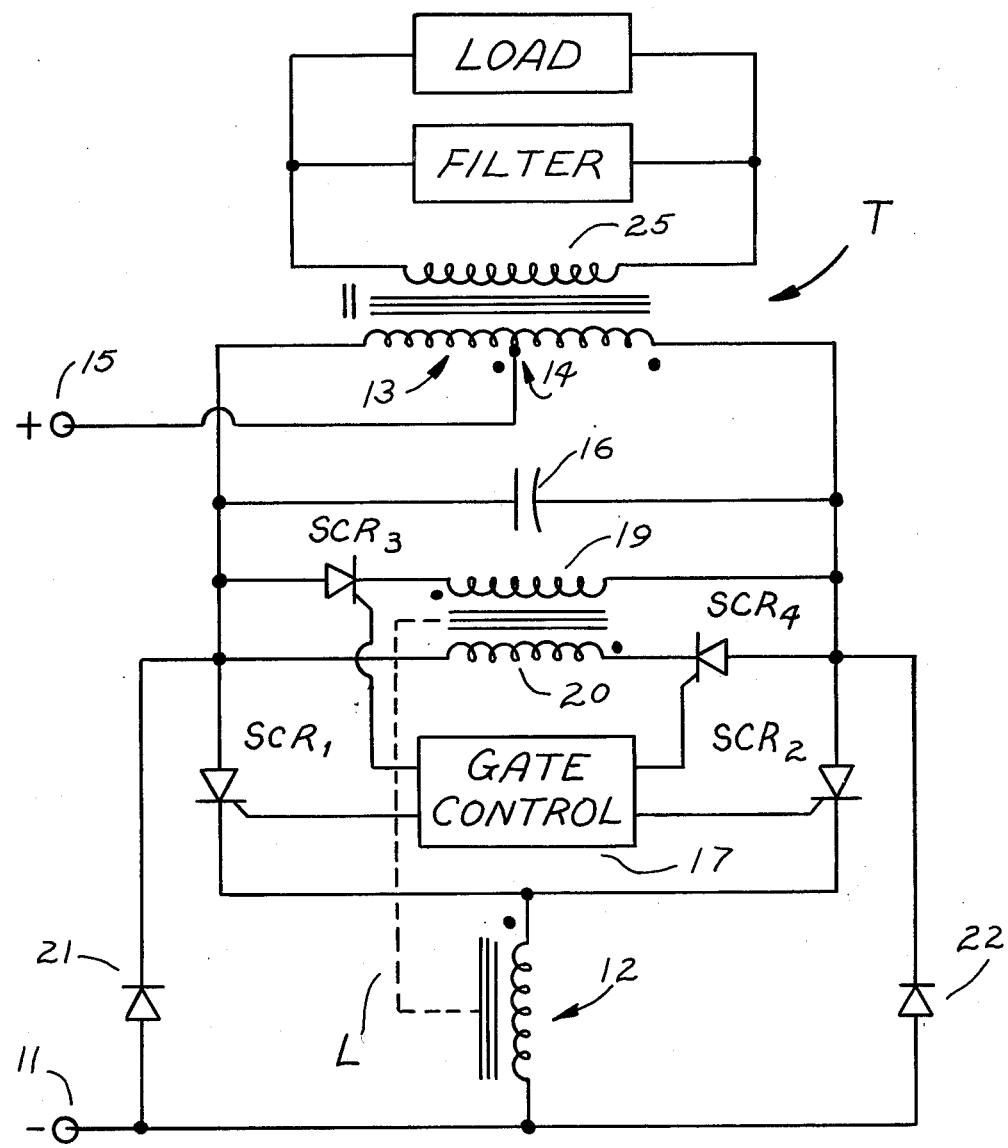
FIG. 1 is a schematic diagram of a parallel inverter circuit embodying the invention.

Referring more particularly to the drawings, and initially to FIG. 1, there is shown an inverter circuit based on the well-known center-tapped transformer design and embodying a unique arrangement of circuit elements in accordance with the invention. One terminal 11 of the DC source is connected to an inductor L having three windings 12, 19, and 20, and then, through a pair of gate-controlled main rectifiers SCR1 and SCR2 to the opposite ends of the primary winding 13 of a shunted transformer T. A center tap 14 of the primary winding 13 is connected to the other terminal 15 of the DC source. A commutating capacitance 16 is connected across the transformer primary winding 13, and a trigger voltage generating means in the form of a digital logic circuit 17 is provided for alternately gating the rectifiers SCR1 and SCR2.

Two gate-controlled, auxiliary rectifiers SCR3 and SCR4 are connected in parallel across the primary winding 13 in reverse directions in the manner illustrated in FIG. 1, and the windings 19 and 20 are coupled to the inductor L referred to above. The winding 19 is connected in series with the auxiliary rectifier SCR3 and the winding 20 is connected in series with the auxiliary rectifier SCR4.

In addition to the elements described, a pair of diodes 21 and 22 are connected between the terminal 11 of the DC source and the respective branches of the circuit on the anode side of both SCR1, and SCR2. The diodes 21 and 22 are used to provide a path for reactive load currents.

The digital logic circuit 17 is also used to gate SCR3 and SCR4, both preferably being gated simultaneously, as will be described in more detail below.

FIG. 2 shows the phasing between the gating signals provided ($v_1$, $v_2$, and $v_3$), and it will be noted that the gating signal $v_2$ for SCR3 and SCR4 has a frequency twice that of the two gating signals $v_1$ and $v_3$ for SCR1 and SCR2, respectively.

Operation

The operation of the circuit of FIG. 1 may be described as follows.

Assume SCR1 is initially gated "ON" by the trigger voltage $v_1$ from the source 17. Load current flows through the secondary winding 25 of T. Current flow through the primary circuit is from the center tap 14 of the primary winding 13 of the transformer T to the lefthand half of the primary winding, through SCR1, then through the inductor 12 and back to the DC source terminal 11. The commutating capacitor 16 is charged by the autotransformer action of the transformer's primary winding 13 to a voltage nearly twice that of the DC supply.

At a time determined by the digital logic circuit 17, gate drive ($v_1$) is removed from SCR 1 and applied ($v_2$) to SCR 3 and SCR 4 simultaneously (see FIG. 2). SCR4 is forward-biased by the voltage on the commutating capacitor 16, and thus begins conducting. As a result, nearly the full voltage of capacitor 16 is applied across the winding 20. Due to the coupling between the windings 20 and 12, a similar voltage is developed across the winding 12, thus reverse-biasing, and therefore commutating, SCR1. As the commutating capacitor 16 discharges, the voltage across the winding 20 (and thus across the winding 12) decreases, finally reaching zero in a period of perhaps 10-50 microseconds. The time interval depends on load current, the values of the inductor L and the commutating capacitor 16 and the level of the DC source voltage. It should be noted that in the preceding events, SCR3 was reverse-biased by the commutating capacitor 16, so that SCR3 and the winding 19 were effectively out of the circuit even though SCR3 was gated ON.

As the voltage across the commutating capacitor 16 reaches zero, the load current through the primary winding 13 of the transformer T will, due to the inductance of the transformer, try to continue to flow in the same direction as when SCR1 was on, or "into the dot." As a result, the flow of current will shift from SCR4 to SCR3 as the commutating capacitor's voltage reaches zero. Since both SCR3 and SCR4 have been gated since the turn-off of SCR1, the transition from SCR4 to SCR3 is smooth and occurs as a natural result of the discharge of the commutating capacitor 16. Likewise, due to possible reactive or switching characteristics of the load, transition of conduction between SCR3 and SCR4 can occur at any time during the period in which they are both gated. With SCR3 and SCR4 gated, the primary of the transformer T is effectively shorted, giving a zero primary voltage, as desired (see FIG. 2 d), without shorting the DC supply.

The commutating capacitor 16 is now discharged to zero volts; however, both terminals of the capacitor 16 are at DC source potential when measured with respect to the negative source voltage of the cathode of SCR2 (voltage across the winding 12 having decayed to zero). At the appropriate time, the control circuit removes gate drive ($v_2$) from SCR3 and SCR4 and applies it ($v_3$) to SCR2. This applies nearly full DC source voltage across the winding 12, and likewise across the windings 19 and 20. The cathode of SCR3 is driven up to nearly double the source voltage, thus reverse-biasing and turning off SCR3. Likewise, SCR4 is reverse-biased by the winding 20 and the DC source voltage and must turn off.

The above process repeats itself in reverse order to go from conduction of SCR2 to conduction of SCR3 and SCR4, and then back to SCR1, where the whole process repeats itself at a rate determined by the desired output frequency of the inverter, generally, 50 Hz or 60 Hz.

By making the transformer of the above-described circuit highly inductive (by shunted construction or other means), the inverter can be inherently short-circuit-proof, since the maximum current will be limited by the transformer inductance. The design and use of ferroresonant transformers with shunted construction (i.e., with magnetic shunts) is discussed on pages 10-106 and 10-107 of Fink and Beaty, STANDARD HANDBOOK FOR ELECTRICAL ENGINEERS, Eleventh Edition, McGraw-Hill Book Company, 1978. Further, the effective series inductance of the transformer will aid in filtering the output so that a sinusoidal output $V_L$ is produced (FIG. 2 e).

By varying the relative times SCR3 and SCR4 are conducting versus the times that SCR1 and SCR2 are conducting, the output $V_L$ is varied, as shown in FIG. 2e.

A particular advantage of the inverter circuit thus described is that the inverter can be easily stopped electronically by designing the electronics such that all gate signals stop only after SCR3 and SCR4 have been gated ON. Once this occurs, SCR1 and SCR2 are both off and the current through SCR3 or SCR4 will naturally go to zero at the next zero crossing of the load current, at which time the circuit will become totally "OFF." The circuit may also be "soft-started" by starting with a low duty cycle for SCR1 and SCR2. This will avoid start-up saturation problems with respect to the transformer T.

While the invention has been shown and described with respect to a particular embodiment thereof, this is for the purpose of illustration rather than limitation, and other variations and modifications of the specific circuit herein shown and described will be apparent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

What is claimed is:

1. In a single-phase DC to AC inverter having an output transformer with primary and secondar windings, means connecting a center tap on said primary winding to one terminal of a source of direct current, a pair of gate-controlled main rectifier means connected between the opposite ends of said primary winding and through an inductor to the other terminal of said source of direct current, a commutating capacitor connected across the primary winding, and means for alternatingly gating said pair of main rectifier means, the improvement which comprises means for varying the voltage across said primary winding by limiting the duration of current flow through said main rectifier means after gating, said means comprising, at least two gate-controlled auxiliary rectifier means connected in parallel across said primary winding in reverse directions, first inductive means series-connected with one of said auxiliary rectifier means, second inductive means series-connected with the other of said auxiliary rectifier means, third inductive means connected between said pair of main rectifier means and said other terminal of said source of direct current, said first, second, and third inductive means being inductively coupled together, and means for gating said auxiliary rectifier means while each of said pair of main rectifier means is alternatingly conducting current therethrough.

2. An inverter circuit as defined in claim 1, wherein said transformer has a shunted construction.

* * * * *